April 20, 1937.  J. J. SEAVER ET AL  2,077,589
FILTERING APPARATUS
Filed Dec. 5, 1934  2 Sheets-Sheet 1
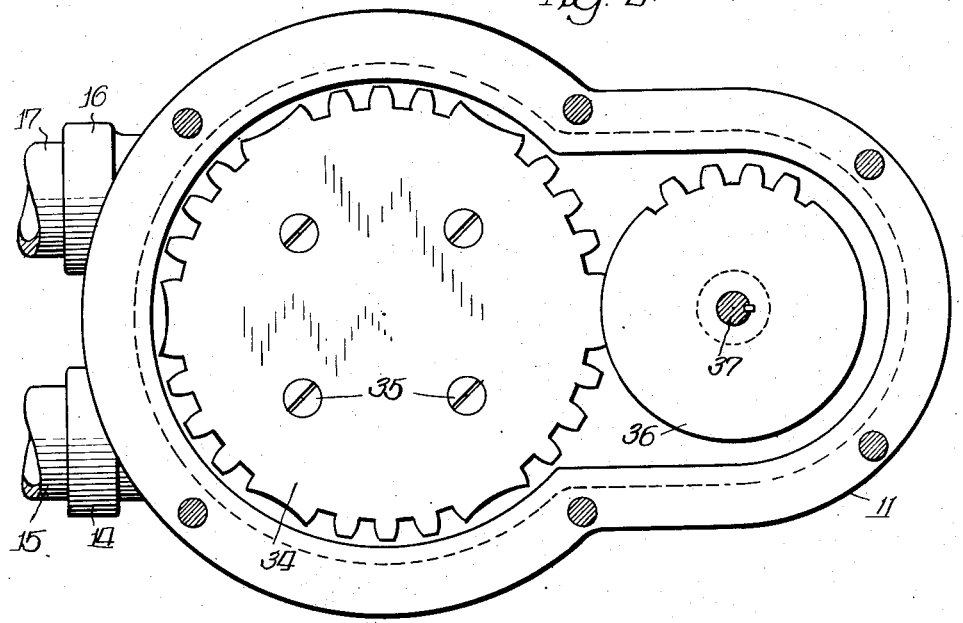
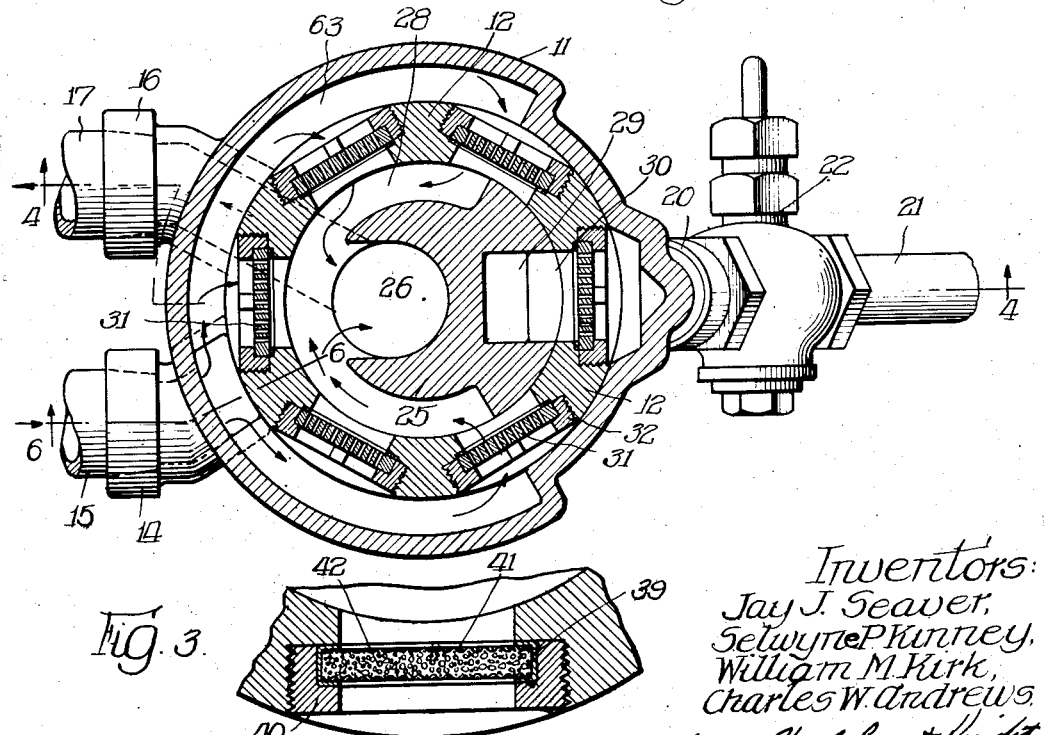
Inventors:
Jay J. Seaver,
Selwyn P. Kinney,
William M. Kirk,
Charles W. Andrews.
By Wilkinson, Huxley, Byron & Knight
Attys April 20, 1937.   J. J. SEAVER ET AL   2,077,589
FILTERING APPARATUS
Filed Dec. 5, 1934   2 Sheets-Sheet 2
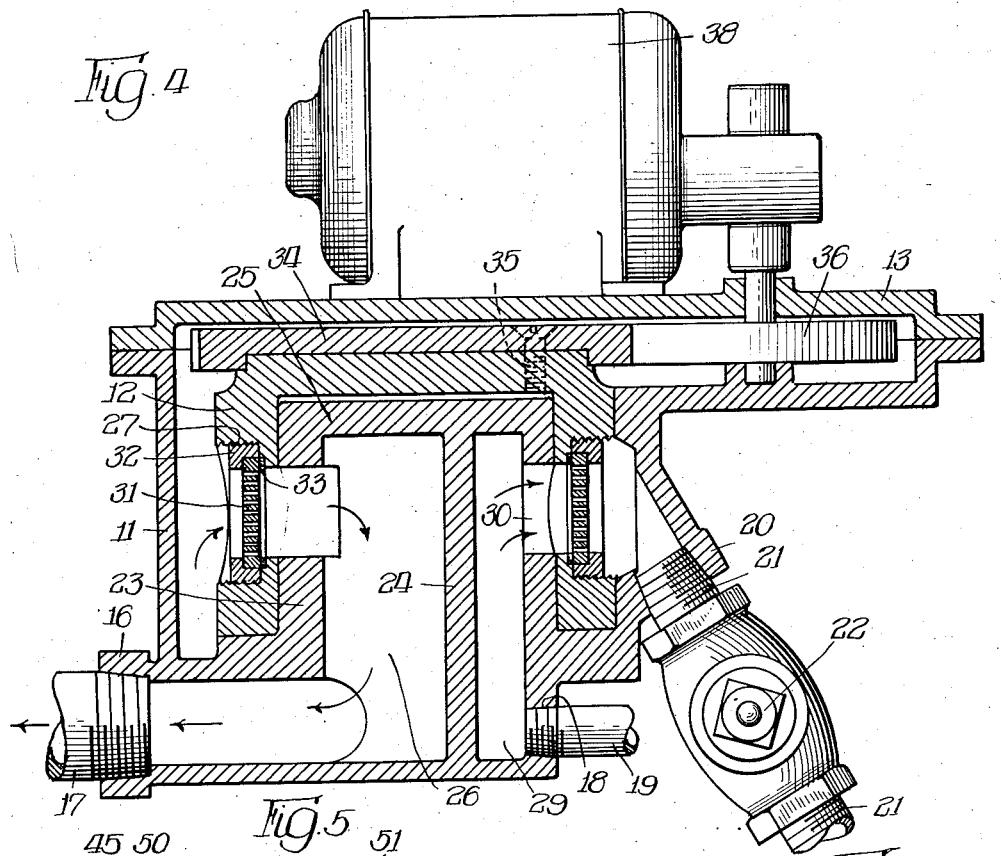
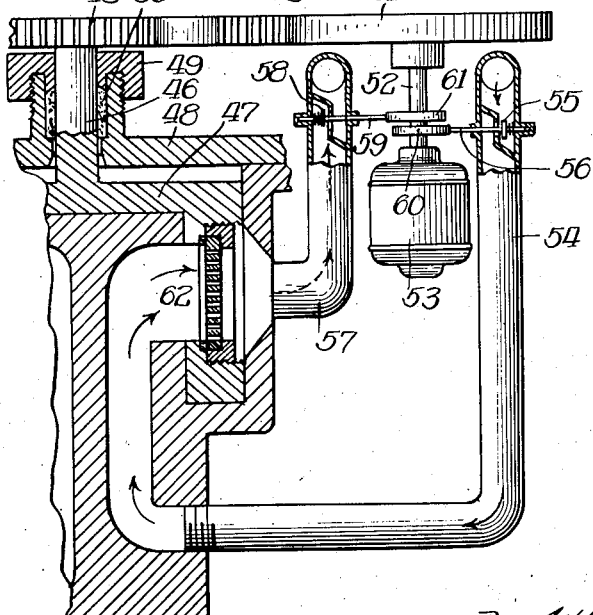
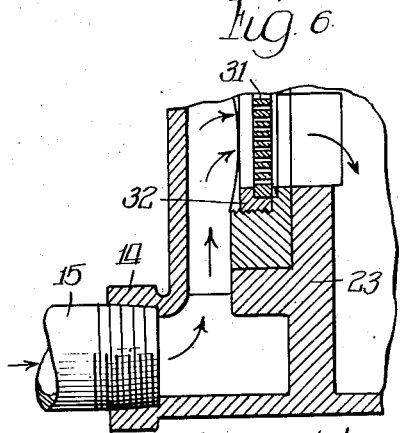
Inventors:
Jay J. Seaver
Selwyne P. Kinney,
William M. Kirk,
Charles W. Andrews.

Patented Apr. 20, 1937

2,077,589

UNITED STATES PATENT OFFICE 2,077,589

FILTERING APPARATUS

Jay J. Seaver and Selwyne P. Kinney, Chicago, William M. Kirk, Wheaton, and Charles W. Andrews, Chicago, Ill., assignors to H. A. Brassert & Company, Chicago, Ill., a corporation of Illinois Application December 5, 1934, Serial No. 756,072

1 Claim. (Cl. 210—167)

This invention relates to a new and improved apparatus for the purpose of straining or filtering liquids containing fibrous matter and suspended solids, particularly such as are contained in streams containing city sewage. The apparatus is also suitable for the removal of fine silt and suspended matter from water. It may also be used in filtering milk, cream and other liquids which may have suspended impurities which it is desired to remove.

Our improved apparatus permits the continuous removal of the suspended matter from the liquid to be treated, to whatever extent may be desired. It further permits the backwashing of the filtering medium concurrently with the filtering operation, the backwashing being carried out by means of a small portion of the filtered product or by any desired backwashing fluid.

It is an object of the present invention to provide a new and improved device for continuous filtering and continuous backwashing of the filtering media.

It is a further object to provide a device in which the moving filtering media are moved in a step by step manner with each filter element in turn stopped before backwashing elements.

It is an additional object to provide a device in which the duration and timing of the backwashing is controlled to minimize leakage and to avoid the necessity for adjustment between the moving parts.

It is also an object to provide a structure in which different filtering media may be readily inserted and removed making a single form of apparatus suitable for many purposes.

It is a further object to provide an apparatus having a rotating and a stationary element whereby the filtering media alternately serve for filtering and are cleaned by backwashing during the continuous operation of the apparatus.

It is an additional object to provide an apparatus composed of but few and simple parts and adapted for commercial production and operation.

Other and further objects will appear as the description proceeds.

We have shown certain preferred embodiments of our invention in the accompanying drawings, in which—

Figure 1 is a horizontal section through the filter;

Figure 2 is a plan view of the drive gear arrangement;

Figure 3 is a fragmentary section showing a modified form of filtering element;

Figure 4 is a vertical section through the form of device shown in Figures 1 and 2, this section being taken on line 4—4 of Figure 1;

Figure 5 is a fragmentary section of a modified form of the device with a somewhat diagrammatic showing of the backwash control; and Figure 6 is a fragmentary section taken on line 6—6 of Figure 1, showing the inlet connections.

The filter assembly shown in Figures 1 to 4 inclusive consists of a housing casting 11, a rotor casting 12, and a cover member 13. The housing member 11 is provided with an inlet port 14 adapted to receive an inlet pipe 15. It is also provided with an outlet port 16 adapted to receive an outlet pipe 17. An opening 18 is further provided to permit the admission of backwashing fluid through the pipe 19. The backwash discharge port 20 is shown connected to the pipe 21 carrying the valve 22.

The housing casting 11 is provided with upwardly extending portions 23 and 24 which are closed at the top by the integral member 25 forming the receiving chamber 26 which communicates with the outlet port 16. These upwardly extending portions have their outer faces cut away on a plane opposite the filter ports 27 to form the offtake chamber 28. This is clearly shown in Figure 1, the passage communicating with the chamber 26. The backwash passage 29 is also formed in the housing casting 11, having a port 30 of the size approximating that of the filter ports 27 and adapted to register with the filter ports as the filter member is rotated. The chamber 63 extends from the inlet port 14 opposite the filter ports 27.

The rotor casting 12 is provided with the filter ports 27 to receive the filter elements 31, which are shown as held in place by the flanges 32 which are threaded in the filter ports 27. The packing 33 is shown against the inner edge of the filter member 31. This rotor casting in the form of construction shown in Figures 1 to 4, has a Geneva driven gear 34 secured to its upper face by means of the screws 35. This gear 34 meshes with the Geneva drive gear 36 which is keyed to shaft 37 and driven by the motor 38.

A modified form of filter element is shown in Figure 3, the cartridge being held in a rim 39 by the threaded flange 40. The cartridge, as shown, has woven face members 41 between which filtering material 42 is held. This filter element is not necessarily of round shape as it may be retained in rotating member 12 by suitable means even if of rectangular or other form.

The form of construction shown in Figure 5 differs from that of the previous figures in that the Geneva driven gear 45 is supported on a shaft 46 connected to the rotating filter member 47. This shaft extends out of the housing 48 and is provided with a gland 49 and packing 50 to prevent leakage. The Geneva drive gear 51 is keyed to shaft 52 driven by motor 53. In this case the backwash fluid comes through pipe 54 controlled by valve 55, having stem 56. The backwash outflow passes through pipe 57 controlled by valve 58 having valve stem 59. The cam discs 60 and 61 are mounted on the drive shaft 52. These cams are so coordinated, as shown, that they open the valves 55 and 58 simultaneously by pressure on the valve stems 56 and 59. This timing will be coordinated with the start and stop drive of the rotary member 46 through the Geneva gear assembly so that the backwash flow occurs while the rotating member is stationary and opposite the backwashing port 62. It will be understood, of course, that the backwash flow may or may not extend for the full period during which the filter member is stopped opposite the backwash port.

The operation of the filter will be readily apparent from the preceding description. The fluid to be cleaned or filtered enters the filter through the port 14, which is in communication with the chamber 63. This chamber 63, as clearly shown in Figure 1, is open on its inner face to the various filter elements carried by the rotating member 12. The fluid to be washed passes through the filter elements, as indicated by the arrows in Figure 1, into chamber 28 and down through chamber 26, to the outlet port 16. Matter removed from the fluid by the filter elements remains caught on the outer face of the filter elements or partially within the openings therethrough, and is carried around by the filter element until the filter element is brought opposite the backwashing port 30. The filtering media are recessed in the rotating member so as to provide ample space for any impurities collected in a single revolution of the filter. The backwashing fluid passing through the filter element in the opposite direction to the filtering flow, washes material off of the filter element and the backwashing fluid and impurities are carried off through the offtake pipe 21.

The filter elements may be formed of a variety of materials, preferably having a low coefficient of friction for the fluid being treated. Examples of such materials are glazed porcelain or glass, resinous materials such as the wide variety of artificial resins having similar low coefficients of friction, and certain polished metals. As an example of metals, a chromium finish on a highly polished surface has been found satisfactory. It is essential that the surface have a low coefficient of friction and it obviously must be non-corrosive to the material being filtered.

It is important that the filter elements have a substantial thickness. This prevents fibers entering one opening and intertwining in the other openings, thus clogging the filter and not being susceptible of removal by the normal backwash. We have found it possible to filter river waters contaminated with sewage from a large city, through filter elements formed of porcelain or similar material, one-eighth inch or more in thickness, through circular openings in the plate one-sixteenth inch in diameter. This filtering has been accomplished with practically no clogging of the openings. On the other hand, using a wire mesh screen of similar sized openings for the same purpose, the fibrous material in the sewage was found to repeatedly interlock with the wires of the screen and clog it to a point where its efficiency was seriously impaired.

We have found it possible to obtain porcelain and similar material of this character with openings as fine as one thirty-second and in some cases one sixty-fourth of an inch in diameter, and for many purposes filtering water through such openings serves all the requirements without additional filtering. In other cases, however, where it is desired to remove fine materials, such as river silt from the water, the use of such filtering elements is not sufficient and we prefer to use sand filtration or its equivalent, either with or without previous treatment by our other type filter element previously described.

For sand filtering we can use a filter cartridge similar to that shown in Figure 3, or it will be understood the cartridge may be of materially greater length than that shown. Both ends of the cartridge are closed with perforated discs or screens, preferably tightly pressing the sand between them, thus preventing its shifting during the operation of filtering. The openings in the ends are, of course, smaller than the smallest size of sand to retain sand or other similar material to be retained therebetween as the filtering member. We have also found that crushed quartz offers a very efficient filtering member on account of its rough cleavages. It is therefore much more efficient than ordinary rounded sand.

Instead of sand held between screens or discs, other filtering material may be used. As examples of such other filtering materials may be mentioned asbestos pulp or fiber which has been found a suitable filtering material. In other cases where a high degree of cleaning is required, filtering papers of proper porosity may be used. Another filtering material which may be used is diatomaceous earth or similar material which may be used between plates or screens or between layers of filtering papers of proper porosity. It will be understood that the type of filter shown may be used with a wide variety of filtering elements. We have discovered that by the use of what might be termed cartridges of sand, we can obtain cleaning effects quite similar to those of pressure filtering. In pressure filtering the filter is backwashed for a few minutes, approximately once in six or eight hours, and the thickness of the bed is such that the filtering rate usually varies from three to four gallons per square foot of surface per minute. We have found that by backwashing at frequent intervals, on the order of minutes rather than hours, we can decrease the thickness of the sand layer to accomplish equal results. To accomplish this we propose to use cartridges or shells varying in length, depending on the kind of material to be filtered; and filled with filtering sand, the degree of fineness depending on the effect to be achieved by the operation.

In the ordinary pressure filter an excessive rate of flow simply dislodges the upper layers of sand, and so some of the sand is carried forward with the cleaned water, thus destroying the benefits of the operation. We avoid this difficulty by enclosing both ends of the cartridge with perforated discs or screens, preferably tightly pressing the sand between them, thus prevent its shifting during the operation of filtering.

As an example of what we have accomplished, a filter was installed on dilute sewage containing 109 parts per million of suspended matter, and this material was first filtered through a 14 mesh screen using a rotating self-cleaning filter. Within twenty minutes the drop in pressure through the screen became noticeable, and constantly increased until it was excessive, amounting to as much as 25 pounds per square inch. Even at this pressure the amount passed through the filter was on the order of 400 gallons per minute. We also found by experiment that punched metal plates of one-eighth inch thickness or less would not prevent intertwining of the fibers. We next substituted porcelain discs one-fourth inch thick and containing one-sixteenth inch holes approximately their diameters apart. The drop in pressure remained constant at approximately one pound. The capacity of the filter, approximately 3,600 gallons per minute, was maintained without interruption over a period of two months at 100% and 63% of the suspended solids were removed. When the filter was opened it was found that practically no interlacing of fibers had occurred in the porcelain holes, and that the surface of the procelain was perfectly clean, indicating that at no time had there been any clogging or building up on the discs. The porcelain surface which was used had an angle of repose of approximately seven and one-half degrees when dry and when sliding on a similar surface.

Obviously other materials than porcelain may be used, though for the most efficient operation a surface having about the same coefficient of friction is important. In some cases the use of porcelain or other non-metallic material is important to prevent electrolytic action. It is necessary to have the holes of sufficient depth to prevent intertwining of fibers, and we have found that one-eighth inch or over is usually necessary.

The continuous cleaning of the filter medium is of the greatest importance in obtaining capacity. For example, the one-sixteenth inch openings pass approximately six gallons per minute each, of which only 5% to 6% is normally used for backwashing; whereas if a mesh screen or punched plate is used this capacity is reduced to approximately one-half gallon for similar sizes on account of the impossibility of keeping the screens clean. The rate of cleaning when sand is used will be lower than the above illustration. Owing, however, to the positive retention of the sand within its enclosures a greater pressure drop can be used and thus the rate of flow will be many times greater than that of the ordinary pressure filter.

It will be apparent that the rotating member may be removed without disturbing any of the pipe connections to the apparatus. Thus the filter elements may be readily removed or replaced, or have other types of elements substituted.

While we have shown certain preferred embodiments of our invention, these are to be understood to be illustrative only, as it is capable of change and modification to meet varying conditions and requirements. While it is important that there be relative movement between the ports and filtering media, it will be apparent that either the ports or media be the moving elements. We contemplate, therefore, such changes and modifications as come within the spirit and scope of the appended claim.

It will be understood that we do not limit ourselves to having filtering means of circular form, as in many cases it will be desirable to use plates of larger size, as for example, 6" x 12" and even larger. The cartridge for containing the sand or other filtering material may also be made of any desired shape and size. Where the backwashing fluid supply is not separately controlled and is taken directly from the stream of filtered material, the member 25 will be modified in shape, and cartridges extending into the space thus made available may be used instead of being limited in length by the thickness of rotating member 12. Where large quantities of water are handled and only a moderate degree of cleanliness is required, our screening means may be adapted to the ordinary type of traveling, stationary or semi-stationary screen with equally good results.

We claim:

In a fluid filter, a fixed housing having fluid intake and outlet passages formed therein, a filter element having openings therein, said filter element being disposed between the fluid intake and outlet passages, porcelain filter members fitting in said openings in the filter element, the thickness of the members being less than the depth of the openings to form pockets to collect impurities removed from the fluid by the filter, the porcelain filter plate being provided with closely spaced small filter passages not exceeding one sixty-fourth of an inch in diameter and approximately their diameters apart, the thickness of the plate being materially greater than the diameter of the filter passages, and means for successively backwashing the filter elements to remove the impurities in the pockets.

JAY J. SEAVER.
SELWYNE P. KINNEY.
WILLIAM M. KIRK.
CHARLES W. ANDREWS.